(12) United States Patent
Fu et al.

(10) Patent No.: US 11,245,242 B2
(45) Date of Patent: Feb. 8, 2022

(54) L-BAND OPTICAL FIBER AMPLIFIER WITH PUMPING BALANCE

(71) Applicant: Accelink Technologies Co., Ltd., Wuhan (CN)

(72) Inventors: Chengpeng Fu, Wuhan (CN); Zhenyu Yu, Wuhan (CN); Qing Liu, Wuhan (CN); Menghui Le, Wuhan (CN); Chunping Yu, Wuhan (CN)

(73) Assignee: Accelink Technologies Co., Ltd., Hubei (CN)

( * ) Notice: Subject to any disclaimer, the term of this patent is extended or adjusted under 35 U.S.C. 154(b) by 504 days.

(21) Appl. No.: 16/230,305

(22) Filed: Dec. 21, 2018

(65) Prior Publication Data

US 2020/0153191 A1 May 14, 2020

(30) Foreign Application Priority Data

Nov. 13, 2018 (CN) .......................... 201811347265.3

(51) Int. Cl.
*H01S 3/00* (2006.01)
*H01S 3/067* (2006.01)
(Continued)

(52) U.S. Cl.
CPC ........ *H01S 3/06787* (2013.01); *H01S 3/0677* (2013.01); *H01S 3/06758* (2013.01);
(Continued)

(58) Field of Classification Search
CPC ............. H01S 3/094011; H01S 3/0677; H01S 3/1608; H01S 3/06758; H01S 3/06787;
(Continued)

(56) References Cited

U.S. PATENT DOCUMENTS

| 5,995,277 A | * | 11/1999 | Kim | ..................... | H01S 3/06758 |
| | | | | | 359/341.33 |
| 2002/0181080 A1 | * | 12/2002 | Lim | .................... | H01S 3/10023 |
| | | | | | 359/337.1 |

(Continued)

FOREIGN PATENT DOCUMENTS

JP 411238927 A * 8/1991 ............... H01S 3/06

*Primary Examiner* — Mark Hellner
(74) *Attorney, Agent, or Firm* — Radlo & Su

(57) ABSTRACT

The present invention relates to the field of optical communication, and particularly to a balanced pumping L-band optical fiber amplifier comprising a first erbium-doped optical fiber, a second erbium-doped optical fiber, an absorbing erbium-doped optical fiber and at least two pumping lasers, the first erbium-doped optical fiber, the second erbium-doped optical fiber and the absorbing erbium-doped optical fiber being sequentially arranged in this order, and the at least two pumping lasers providing pumping light; wherein the first erbium-doped optical fiber and the second erbium-doped optical fiber both are injected with forward pumping light and backward pumping light, and the absorbing erbium-doped fiber is arranged downstream of the second erbium-doped optical fiber to absorb amplified spontaneous emission (ASE) generated in the amplifier. In the present invention, bidirectional pumping 1s applied in the first and last erbium-doped fibers in the optical path, and an erbium-doped optical fiber that has no pumping injection is added to absorb the ASE. Thus, the pumping conversion efficiency is greatly improved, the nonlinear four-wave mixing effect is reduced, and the problem that the L-band optical fiber amplifier has a high noise when utilizing the backward pumping 1s solved. Meanwhile, the noise figure and the manufacturing cost of the amplifier are reduced.

16 Claims, 3 Drawing Sheets

(51) Int. Cl.
*H01S 3/094* (2006.01)
*H01S 3/16* (2006.01)

(52) U.S. Cl.
CPC ...... *H01S 3/094011* (2013.01); *H01S 3/1608* (2013.01); *H01S 2301/02* (2013.01)

(58) Field of Classification Search
CPC ......... H01S 3/094096; H01S 3/094061; H01S 2301/02; H01S 2301/03; H01S 2301/04
See application file for complete search history.

(56) References Cited

U.S. PATENT DOCUMENTS

| | | | |
|---|---|---|---|
| 2003/0058526 A1* | 3/2003 | Kakui | H01S 3/06758 359/341.3 |
| 2005/0135438 A1* | 6/2005 | Kim | H01S 3/06795 372/6 |

\* cited by examiner

L-BAND OPTICAL FIBER AMPLIFIER WITH PUMPING BALANCE

FIELD OF THE INVENTION

The present invention relates to the field of optical communication, and particularly to a balanced pumping L-band optical fiber amplifier.

BACKGROUND OF THE INVENTION

Along with the introduction of the "internet+" concept, the development of technologies such as 5G, cloud computing, big data, and internet of things (IoT) imposes higher demand on bandwidth and rate of the existing communication network. For either a data center or a conventional telecommunication network, a 100 Gbit/s system is widely used, and 200 Gbits/s and 400 Gbit/s systems are in a trial stage. The over-100G system usually uses a dual-carrier or multi-carrier scheme with a modulation format of 8QAM or 16QAM, which has a low spectrum utilization. The conventional C-band (1528-1568 nm) cannot meet the demand for bandwidth, and the demand of the system for L-band (1570-1610 nm) becomes more and more urgent.

An optical fiber amplifier usually includes an optical path structure implemented by two or three or more erbium-doped fibers. In a conventional C-band fiber amplifier, in general, all the optical fibers adopt forward pumping, or only the last optical fiber adopts backward pumping and other optical fibers adopt forward pumping. As the erbium-doped optical fibers included in the L-band optical fiber amplifier have a length much longer than, usually 8-10 times of that in the C-band optical fiber amplifier, the conventional C-band optical path structure cannot be directly used in the L-band amplifier because it may cause some problems such as a high noise figure, a low conversion efficiency, and series non-linear four-wave mixing in the optical fibers. In addition, in the L-band fiber amplifier, power for pumping the first erbium-doped fiber needs to be greatly increased to reduce the noise figure, and power for pumping the last erbium doped fiber needs to be greatly increased to improve the output power, thereby causing a much higher cost and much lower performance than the C-band fiber amplifier.

Therefore, there is an urgent need to overcome the above defects in the prior arts.

SUMMARY OF THE INVENTION

The present invention is to solve a technical problem that:

As the L-band optical fiber amplifier includes a large length of erbium-doped optical fibers, when the conventional C-band optical path structure is directly applied in the L-band amplifier, it may cause problems such as a high noise figure, a low conversion efficiency, and series non-linear four-wave mixing in the optical fibers, and the manufacturing cost of the L-band optical fiber amplifier is high.

The present invention achieves the goal by the following technical solution:

The present invention provides a balanced pumping L-band optical fiber amplifier comprising a first erbium-doped optical fiber 1-1, a second erbium-doped optical fiber 1-2, an absorbing erbium-doped optical fiber 1-3 and at least two pumping lasers, the first erbium-doped optical fiber 1-1, the second erbium-doped optical fiber 1-2 and the absorbing erbium-doped optical fiber 1-3 being sequentially arranged in this order, and the at least two pumping lasers providing pumping light;

Wherein the first erbium-doped optical fiber 1-1 is injected with forward pumping light and backward pumping light by the at least two pumping lasers, the second erbium-doped optical fiber 1-2 is injected with forward pumping light and backward pumping light by the at least two pumping lasers, and the absorbing erbium-doped fiber 1-3 is arranged downstream of the second erbium-doped optical fiber 1-2 to absorb amplified spontaneous emission (ASE) generated in the amplifier.

Preferably, each pumping laser adopts an independent pumping mode or a splitting pumping mode to provide the pumping light for the erbium-doped optical fibers that need to be injected with the pumping light.

Preferably, the amplifier further comprises a first isolator 2-1, a first combiner 3-1, a second combiner 3-2, a third combiner 3-3, a fourth combiner 3-4, a second isolator 2-2 and a third isolator 2-3 connected sequentially in this order;

Wherein the first erbium-doped optical fiber 1-1 is connected between a common end of the first combiner 3-1 and a common end of the second combiner 3-2, the second erbium-doped optical fiber 1-2 is connected between a common end of the third combiner 3-3 and a common end of the fourth combiner 3-4, and the absorbing erbium-doped optical fiber 1-3 is connected between the second isolator 2-2 and the third isolator 2-3.

Preferably, the at least two pumping lasers comprise a first pumping laser 4-1 and a second pumping laser 4-2, and the optical fiber amplifier further comprises a first pumping beam splitter 5-1 and a second pumping beam splitter 5-2;

Wherein the first pumping laser 4-1 is connected with a common end of the first pumping beam splitter 5-1, a first splitting port of the first pumping beam splitter 5-1 is connected with a pumping end of the first combiner 3-1, and a second splitting port of the first pumping beam splitter 5-1 is connected with a pumping end of the third combiner 3-3, so that the first pumping laser 4-1 injects forward pumping light into the first erbium-doped optical fiber 1-1 and the second erbium-doped optical fiber 1-2 in a splitting pumping mode;

The second pumping laser 4-2 is connected with a common end of the second pumping beam splitter 5-2, a first splitting port of the second pumping beam splitter 5-2 is connected with a pumping end of the fourth combiner 3-4, and a second splitting port of the second pumping beam splitter 5-2 is connected with a pumping end of the second combiner 3-2, so that the second pumping laser 4-2 injects backward pumping light into the second erbium-doped optical fiber 1-2 and the first erbium-doped optical fiber 1-1 in a splitting pumping mode.

Preferably, the amplifier further comprises a gain flatten filter 6 connected between a signal end of the second combiner 3-2 and a signal end of the third combiner 3-3, the gain flatten filter 6 itself has an integrated isolator.

Preferably, between the second combiner 3-2 and the gain flatten filter 6 are provided a fourth isolator 2-4, a variable optical attenuator 7, a fifth combiner 3-5 and a third erbium-doped optical fiber 1-4 sequentially connected in this order, and the third erbium-doped optical fiber 1-4 is connected with a common end of the fifth combiner 3-5.

Preferably, the at least two pumping lasers comprise a first pumping laser 4-1, a second pumping laser 4-2 and a third pumping laser 4-3, and the optical fiber amplifier further comprises a first pumping beam splitter 5-1 and a second pumping beam splitter 5-2;

Wherein the first pumping laser 4-1 is connected with a common end of the first pumping beam splitter 5-1, a first splitting port of the first pumping beam splitter 5-1 is connected with a pumping end of the first combiner 3-1, and a second splitting port of the first pumping beam splitter 5-1 is connected with a pumping end of the third combiner 3-3, so that the first pumping laser 4-1 injects forward pumping light into the first erbium-doped optical fiber 1-1 and the second erbium-doped optical fiber 1-2 in a splitting pumping mode;

The second pumping laser 4-2 is connected with a common end of the second pumping beam splitter 5-2, a first splitting port of the second pumping beam splitter 5-2 is connected with a pumping end of the fourth combiner 3-4, and a second splitting port of the second pumping beam splitter 5-2 is connected with a pumping end of the second combiner 3-2, so that the second pumping laser 4-2 injects backward pumping light into the second erbium-doped optical fiber 1-2 and the first erbium-doped optical fiber 1-1 in a splitting pumping mode;

The third pumping laser 4-3 is connected with a pumping end of the fifth combiner 3-5, so that the third pumping laser 4-3 injects forward pumping light into the third erbium-doped optical fiber 1-4 in an independent pumping mode.

Preferably, the at least two pumping lasers comprise a first pumping laser 4-1, a second pumping laser 4-2 and a third pumping laser 4-3, and the optical fiber amplifier further comprises a second pumping beam splitter 5-2 and a third pumping beam splitter 5-3;

Wherein the first pumping laser 4-1 is connected with a pumping end of the first combiner 3-1, so that the first pumping laser 4-1 injects forward pumping light into the first erbium-doped optical fiber 1-1 in an independent pumping mode;

The second pumping laser 4-2 is connected with a common end of the second pumping beam splitter 5-2, a first splitting port of the second pumping beam splitter 5-2 is connected with a pumping end of the fourth combiner 3-4, and a second splitting port of the second pumping beam splitter 5-2 is connected with a pumping end of the second combiner 3-2, so that the second pumping laser 4-2 injects backward pumping light into the second erbium-doped optical fiber 1-2 and the first erbium-doped optical fiber 1-1 in a splitting pumping mode;

The third pumping laser 4-3 is connected with a common end of the third pumping beam splitter 5-3, the first splitting port of the third pumping beam splitter 5-3 is connected with a pumping end of the fifth combiner 3-5, and a second splitting port of the third pumping beam splitter 5-3 is connected with a pumping end of the third combiner 3-3, so that the third pumping laser 4-3 injects forward pumping light into the third erbium-doped optical fiber 1-4 and the second erbium-doped optical fiber 1-2 in a splitting pumping mode.

Preferably, for any one of the pumping beam splitters, a splitting ratio of the first splitting port may be in a range from 70% to 90%, and a splitting ratio of the second splitting port may be in a range of 30% to 10%.

Preferably, the at least two pumping lasers generate pumping light with wavelength that satisfies the following conditions: wavelength of the backward pumping light ranges from 1460 nm to 1490 nm, wavelength of the forward pumping light ranges from 973 nm to 982 nm.

The present invention produces the following beneficial effects:

According to the present invention, the backward pumping is applied into the L-band amplifier, and bidirectional pumping is carried out in the first and last erbium-doped fibers that have the largest influence on the noise figure and the conversion efficiency in the optical path. In addition to the erbium-doped optical fibers that are pumped, a relatively short erbium-doped optical fiber that has no pumping injection is added to absorb the ASE. Thus, the problem that the L-band optical fiber amplifier has a high noise when utilizing backward pumping is solved, the pumping conversion efficiency is greatly improved, and the nonlinear four-wave mixing effect is reduced. Meanwhile, the noise figure of the amplifier is effectively reduced, and the manufacturing cost of the L-band optical fiber amplifier is also greatly reduced.

BRIEF DESCRIPTION OF THE DRAWINGS

In order to more clearly illustrate the technical solutions of embodiments of the present invention, accompanying drawings showing examples of the embodiments will be briefly introduced below. Apparently, the accompanying drawings merely show some embodiments of the present invention, and persons of ordinary skill in the art will appreciate other drawings according to the accompanying drawings without creative efforts.

DETAILED DESCRIPTION OF THE PREFERRED EMBODIMENTS

In order to make the goals, technical solutions and advantages of the present invention clear and apparent, the present invention will be further discussed in detail with reference to the accompanying drawings and the embodiments. It should be understood that the specific embodiments described herein are only used to explain the present invention but not to limit the present invention in any way.

In the description of the present invention, the terms "in", "outside", "longitudinal", "lateral", "on", "below", "top", and "bottom" or the like are used to indicate orientation or position relationships based on the accompanying drawings for the sake of description of the present invention, but they do not require the present invention to be constructed and operated in the particular orientation or position relationships. Therefore, the terms should not be construed as limits on the present invention.

Figure 1:
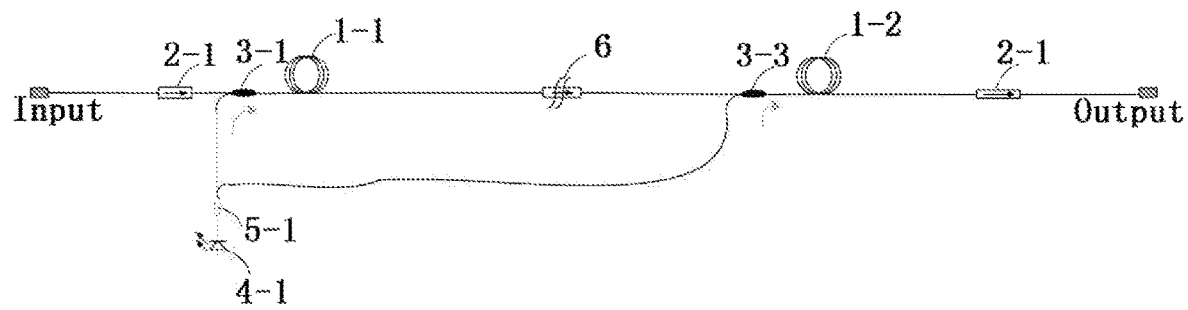
FIG. 1 is a schematic structural diagram showing an existing C-band optical fiber amplifier.
Figure 2:
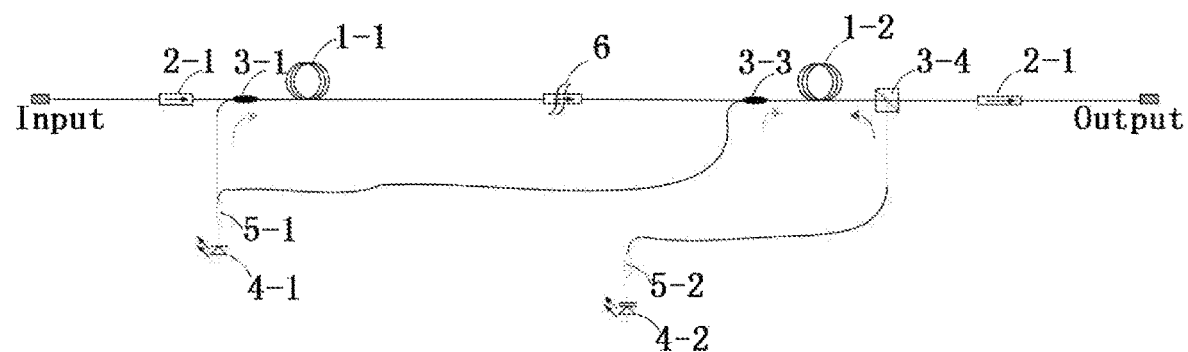
FIG. 2 is a schematic structural diagram showing another existing C-band optical fiber amplifier.

FIGS. 1 and 2 show conventional C-band optical fiber amplifiers, which, as an example, each include two erbium-doped optical fibers arranged in the optical fiber amplifier. In FIG. 1, the two erbium-doped fibers both adopt forward pumping, while in FIG. 2, the last optical fiber adopts bidirectional pumping, and the first erbium-doped optical fiber adopts forward pumping. For the C-band fiber amplifier, the last fiber does not have a significant influence on the noise figure and the non-linear four-wave mixing no matter it adopts forward, backward or bidirectional pumping; but for the L-band optical fiber amplifier, the pumping mode has a significant influence on the noise figure and the nonlinearity. Detailed analysis is as follows:

As the L-band optical fiber amplifier needs much longer erbium-doped optical fibers than the C-band optical fiber amplifier does, the conventional C-band optical path structure cannot be directly used in the L-band amplifier because it may cause some problems: when the L-band fiber amplifier adopts all forward pumping as shown in FIG. 1, the conversion efficiency would be low, and the non-linear four-wave mixing would be serious; backward pumping will greatly increase the noise figure of the short wavelength in the L-band amplifier, and when the L-band amplifier has a low requirement on the noise figure, it can adopt the structure shown in FIG. 2, but when it has a high requirement on the noise figure, the last erbium-doped optical fiber in the L-band amplifier cannot adopt backward pumping, and it is not appropriate for the L-band optical fiber amplifier to directly adopt the solution shown in FIG. 2. Therefore, the conventional C-band optical path structure cannot be directly applied in the L-band amplifier, and certain optimization or improvement is still needed.

The present invention will be discussed in detail with reference to the accompanying drawings and embodiments, where the technical features involved in the embodiments of the present invention described below can be combined with each other as long as there is no conflict between each other.

Embodiment 1

Figure 3:
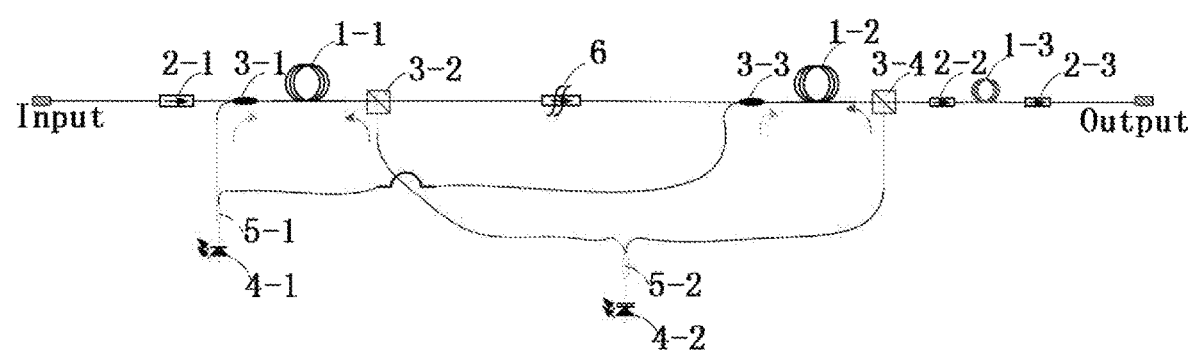
FIG. 3 is a schematic structural diagram showing a fixed gain balanced pumping L-band amplifier according to an embodiment of the present invention.
Figure 4:
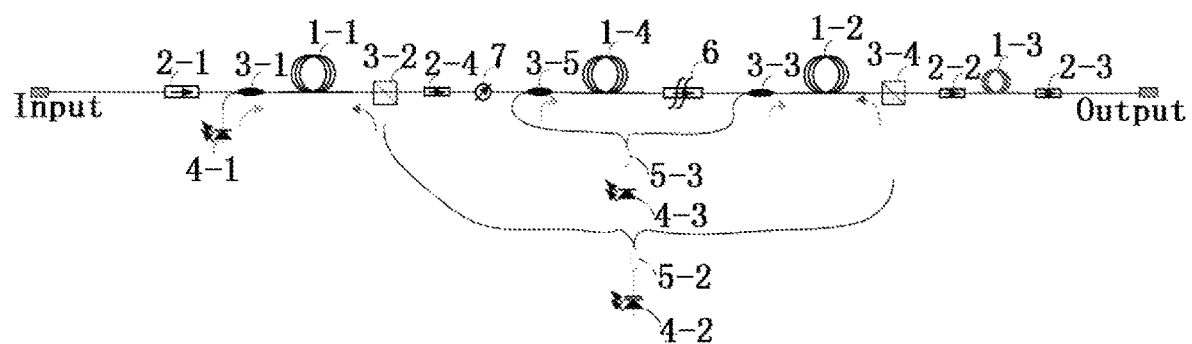
FIG. 4 is a schematic structural diagram showing a variable gain balanced pumping L-band amplifier according to an embodiment of the present invention.
Figure 5:
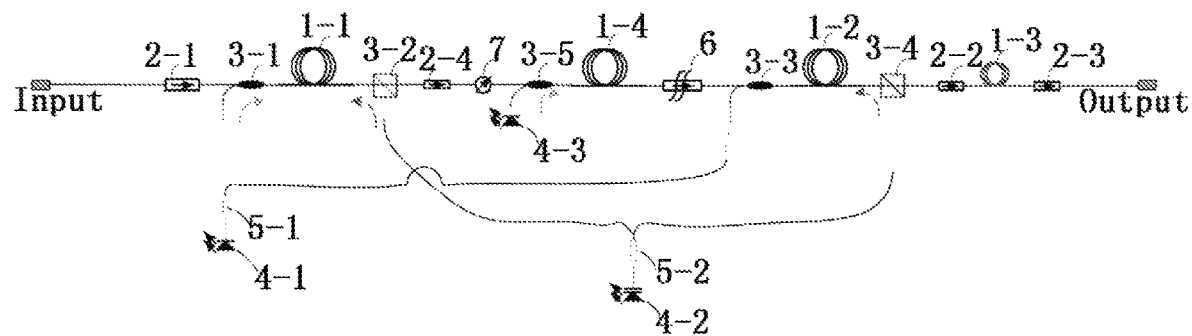
FIG. 5 is a schematic structural diagram showing a variable gain balanced pumping L-band amplifier according to another embodiment of the present invention.

The embodiment of the present invention provides a balanced pumping L-band optical fiber amplifier, as shown in FIGS. 3-5, comprising a first erbium-doped optical fiber 1-1, a second erbium-doped optical fiber 1-2, an absorbing erbium-doped optical fiber 1-3 and at least two pumping lasers, the first erbium-doped optical fiber 1-1, the second erbium-doped optical fiber 1-2 and the absorbing erbium-doped optical fiber 1-3 being sequentially arranged in this order, the at least two pumping lasers providing pumping light; wherein the first erbium-doped optical fiber 1-1 is injected with forward pumping light and backward pumping light by the at least two pumping lasers, the second erbium-doped optical fiber 1-2 is also injected with forward pumping light and backward pumping light by the at least two pumping lasers. Compared with the existing double forward pumping, the present invention additionally provides backward pumping, so that the two erbium-doped optical fibers both are bidirectional pumped. In addition, an erbium-doped optical fiber without pumping light injection, i.e., the absorbing erbium-doped fiber 1-3, which is relatively shorter than the erbium-doped fibers with pumping light injection, is added downstream the second erbium-doped fiber 1-2 to absorb the amplified spontaneous emission (ASE) generated in the amplifier.

The optical fiber amplifier generally includes at least two erbium-doped optical fibers that need to be injected with the pumping light. According to the order of connection, the first erbium-doped optical fiber 1-1 is the first erbium-doped optical fiber in the optical path that needs to be injected with the pumping light, and the second erbium-doped optical fiber 1-2 is the last erbium-doped optical fiber in the optical path that needs to be injected with the pumping light. In some embodiments, preferably, bidirectional pumping is adopted for each erbium-doped optical fiber except the absorbing erbium-doped optical fiber 1-3; in some other embodiments, preferably, bidirectional pumping is adopted for the first erbium-doped optical fiber 1-1 and the second erbium-doped optical fiber 1-2 while the other erbium-doped optical fibers adopts forward pumping.

In the balanced pumping L-band optical fiber amplifier of the embodiment, the backward pumping is successfully applied in the L-band amplifier by adopting bidirectional pumping for both the first and last erbium-doped optical fibers, and degradation of the short-wave noise figure caused thereby is improved through the relatively short erbium-doped optical fiber without pumping. Thus, the problem that the L-band optical fiber amplifier adopting the backward pumping has high noise is solved, the pumping conversion efficiency is greatly improved, and the non-linear four-wave mixing effect is reduced. Meanwhile, the noise figure of the amplifier is effectively reduced, and the manufacturing cost of the L-band optical fiber amplifier is greatly reduced.

The L-band optical fiber amplifier may be a fixed gain amplifier (FGA) or a variable gain amplifier (VGA). No matter FGA or VGA, the at least two pumping lasers each, as a pumping light source, may be in an independent pumping mode or a splitting pumping mode to inject pumping light into the erbium-doped fibers that need pumping. The independent pumping refers to that the pumping laser provides forward pumping light or backward pumping light for only a single erbium-doped fiber, and the splitting pumping refers to that the pumping laser provides forward pumping light or backward pumping light for two erbium-doped fibers simultaneously through beam splitting where the splitting ratio may be set according to actual needs. In the following description, the pumping laser in the splitting pumping mode is taken as an example for describing the embodiments, but the invention is not limited thereto.

As shown in FIG. 3, in an embodiment, the L-band optical fiber amplifier may be a FGA including two erbium-doped optical fibers that need to be injected with pumping light. The FGA may include a first isolator 2-1, a first combiner 3-1, a first erbium-doped optical fiber 1-1, a second combiner 3-2, a third combiner 3-3, a second erbium-doped optical fiber 1-2, a fourth combiner 3-4, a second isolator 2-2, an absorbing erbium-doped optical fiber 1-3 and a third isolator 2-3 connected sequentially in this order. In general, in order to achieve a flatten gain of the amplifier, the FGA may further include a gain flatten filter 6 connected between the second combiner 3-2 and the third combiner 3-3, and the gain flatten filter 6 itself may have an integrated isolator.

The specific connection may be as follows: an input end of the amplifier is connected with an input end of the first isolator 2-1, an output end of the first isolator 2-1 is connected with a signal end of the first combiner 3-1, a common end of the first combiner 3-1 is connected with the first erbium-doped optical fiber 1-1, the first erbium-doped optical fiber 1-1 is further connected with a common end of the second combiner 3-2, a signal end of the second combiner 3-2 is connected with an input end of the gain flatten filter 6, an output end of the gain flatten filter 6 is connected with a signal end of the third combiner 3-3, a common end of the third combiner 3-3 is connected with the second erbium-doped optical fiber 1-2, the second erbium-doped optical fiber 1-2 is further connected with a common end of the fourth combiner 3-4, a signal end of the fourth combiner 3-4 is connected with an input end of the second isolator 2-2, an output end of the second isolator 2-2 is connected with an input end of the absorbing erbium-doped optical fiber 1-3, an output end of the absorbing erbium-doped optical fiber 1-3 is connected with an input end of the third isolator 2-3, and an output end of the third isolator 2-3 is connected with an output end of the amplifier.

With continued reference to FIG. 3, the at least two pumping lasers include a first pumping laser 4-1 for injecting forward pumping light into the first erbium-doped optical fiber 1-1 and the second erbium-doped optical fiber 1-2 in a splitting pumping mode, and a second pumping laser 4-2 for injecting backward pumping light into the second erbium-doped optical fiber 1-2 and the first erbium-doped optical fiber 1-1 in the splitting pumping mode. The specific implementation may be as follows: the FGA further includes a first pumping beam splitter 5-1 and a second pumping beam splitter 5-2, the first pumping laser 4-1 is connected with a common end of the first pumping beam splitter 5-1, a first splitting port of the first pumping beam splitter 5-1 is connected with an pumping end of the first combiner 3-1, and a second splitting port of the first pumping beam splitter 5-1 is connected with a pumping end of the third combiner 3-3; the second pumping laser 4-2 is connected with a common end of the second pumping beam splitter 5-2, a first splitting port of the second pumping beam splitter 5-2 is connected with a pumping end of the fourth combiner 3-4, and a second splitting port of the second pumping beam splitter 5-2 is connected with a pumping end of the second combiner 3-2. If independent pumping is applied, four pumping lasers are needed for bidirectional pumping of the first erbium-doped optical fiber 1-1 and the second erbium-doped optical fiber 1-2. By utilizing splitting pumping, the present invention needs only two pumping lasers, so that not only is the cost saved, but also the overall performance of the amplifier in the splitting pumping mode, as proved by test, is improved, which will be described in detail later.

In the above FGA structure, the two erbium-doped fibers both are implemented by bidirectional pumping. As each of the two erbium-doped fibers is relatively long, pumping wavelengths may be the same as or different from each other. For backward pumping, the wavelength of around 1480 nm has a high conversion efficiency. In comprehensive consideration of cost and performance, the forward pumping is generally configured to be of a wavelength around 980 nm, the backward pumping is generally configured to be of a wavelength around 1480 nm, and wavelength of the pumping light generated by the pumping laser satisfies the following conditions: the backward pumping light generated by the second pumping laser 4-2 has a wavelength in a range of 1460 nm to 1490 nm, and the forward pumping light generated by the first pumping laser 4-1 has a wavelength in a range of 973 nm to 982 nm.

In the embodiment, preferably, for any one of the pumping beam splitter, a splitting ratio of the first splitting port is larger than that of the corresponding second splitting port, and the splitting ratio of the first splitting port is in a range of 70% to 90%, the splitting ratio of the corresponding second splitting port is in a range of 30% to 10%. For example, in the present embodiment, the splitting ratio of the first splitting port is 80%, and the splitting ratio of the second splitting port is 20%. The first pumping laser 4-1 mainly provides forward pumping light for the first erbium-doped optical fiber 1-1, and only a small part (i.e., 20%) of the forward pumping light is split our for the second erbium-doped optical fiber 1-2. The second pumping laser 4-2 mainly provides backward pumping light for the second erbium-doped optical fiber 1-2, and only a small part (i.e., 20%) is split out for the first erbium-doped optical fiber 1-1. By setting of the splitting ratio, the overall performance of the amplifier may be better optimized.

In the present embodiment, the backward pumping is successfully applied into the L-band amplifier, thereby greatly improving the pumping conversion efficiency and reducing the non-linear four-wave mixing effect. The degradation of the short-wave noise figure, which may be caused by application of the backward pumping in the L-band amplifier, may be improved through the relatively short erbium-doped optical fiber without pumping, and the noise figure of the amplifier is effectively reduced. In the L-band optical fiber amplifier, each erbium-doped optical fiber may be considered as an amplifier, and the whole may be considered as a cascade amplifier, of which an equivalent noise figure NF may be calculated according to a formula $NF=NF_1+(NF_2-1)/G1$ where $NF_1$ is the noise figure of the first erbium-doped optical fiber, and G1 is the gain of the last erbium-doped fiber. In order to decrease the overall noise figure NF, G1 needs to be increased and $NF_1$ needs to be reduced as much as possible. For the C-band amplifier, a general approach is to increase the injection power of the first erbium-doped optical fiber, but it has very little effect in the L-band amplifier due to the fact that in the L-band amplifier, the lengths of the erbium-doped optical fibers are relatively long in order to amplify the L-band signal, and when the pumping power injected into the first erbium-doped optical fiber continuously increases, the generated backward amplifier spontaneous emission (ASE) noise also continuously increases, and most of the energy added by pumping is converted into ASE. The present invention can greatly increase the gain and reduce the noise figure of the first erbium-doped optical fiber by applying bidirectional balanced pumping in the two erbium-doped optical fibers and additionally including the absorbing erbium-doped optical fiber without pumping injection, and thereby the overall noise figure is reduced.

Embodiment 2

The specific structure of the fixed gain L-band amplifier FGA has been introduced in Embodiment 1, and on the basis of Embodiment 1, the specific structure of the variable gain L-band amplifier VGA will be introduced in this embodiment. The main difference from the FGA is that a variable optical attenuator (VOA) is added in the VGA. As the variable optical attenuator has a large insert loss, and the gain flatten filter has also a large loss at certain wavelength, the two elements will greatly influence the noise figure if they are placed together. Therefore, the two elements need to be arranged with different erbium-doped optical fibers. For this reason, the VGA structure will have one more erbium-doped optical fiber than the FGA structure, and the one more erbium-doped optical fiber is noted as a third erbium-doped optical fiber 1-4. The third erbium-doped optical fiber 1-4 has little influence on the noise figure and the output power, so it may have bidirectional pumping injection or forward pumping injection, while the first and last erbium-doped optical fibers still adopt bidirectional pumping. Also, a relatively short erbium-doped optical fiber that has no pumping injection is added to absorb the ASE power. The positions of the VOA and the gain flatten filter can be exchanged to some extent, and in the present embodiment, as an example, the VOA is placed before the gain flatten filter. The specific structure of the VGA is as follows:

As shown in FIG. 4 and FIG. 5, compared with the FGA structure in FIG. 3, a fourth isolator 2-4, a variable optical attenuator 7, a fifth combiner 3-5 and a third erbium-doped optical fiber 1-4 are additionally arranged between the second combiner 3-2 and the third combiner 3-3. Thus, the VGA comprises the first isolator 2-1, the first combiner 3-1, the first erbium-doped optical fiber 1-1, the second combiner 3-2, the fourth isolator 2-4, the variable optical attenuator 7, the fifth combiner 3-5, the third erbium-doped optical fiber 1-4, the gain flatten filter 6, the third combiner 3-3, the second erbium-doped optical fiber 1-2, the fourth combiner 3-4, the second isolator 2-2, the absorbing erbium-doped optical fiber 1-3 and the third isolator 2-3 sequentially connected in this order. The description in relation to the Embodiment 1 may be referenced here for the specific connection, where the signal end of the second combiner 3-2 is connected with the input end of the fourth isolator 2-4, the output end of the fourth isolator 2-4 is connected with the input end of the variable optical attenuator 7, the output end of the variable optical attenuator 7 is connected with the signal end of the fifth combiner 3-5, the common end of the fifth combiner 3-5 is connected with the third erbium-doped optical fiber 1-4, and the third erbium-doped optical fiber 1-4 is further connected with the input end of the gain flatten filter 6.

The additionally arranged third erbium-doped optical fiber 1-4 may receive pumping light from a separate pumping laser as shown in FIG. 4, or from a pumping laser in the splitting pumping mode as shown in FIG. 5. The two different pumping modes will be described taking the third erbium-doped optical fiber 1-4 with forward pumping as an example:

In the first mode, referring to FIG. 4, the at least two pumping lasers comprise the first pumping laser 4-1, the second pumping laser 4-2 and a third pumping laser 4-3. The first pumping laser 4-1 injects forward pumping light into the first erbium-doped optical fiber 1-1 and the second erbium-doped optical fiber 1-2 by splitting pumping, the second pumping laser 4-2 injects backward pumping light into the second erbium-doped optical fiber 1-2 and the first erbium-doped optical fiber 1-1 by splitting pumping, and the third pumping laser 4-3 injects forward pumping light into the third erbium-doped optical fiber 1-4 by independent pumping. The specific implementation may be as follows:

The VGA further comprises a first pumping beam splitter 5-1 and a second pumping beam splitter 5-2. The first pumping laser 4-1 is connected with a common end of the first pumping beam splitter 5-1, a first splitting port of the first pumping beam splitter 5-1 is connected with the pumping end of the first combiner 3-1, and a second splitting port of the first pumping beam splitter 5-1 is connected with the pumping end of the third combiner 3-3. The second pumping laser 4-2 is connected with a common end of the second pumping beam splitter 5-2, a first splitting port of the second pumping beam splitter 5-2 is connected with the pumping end of the fourth combiner 3-4, and a second splitting port of the second pumping beam splitter 5-2 is connected with the pumping end of the second combiner 3-2. The third pumping laser 4-3 is connected with the pumping end of the fifth combiner 3-5.

Second, referring to FIG. 5, the at least two pumping lasers comprise the first pumping laser 4-1, the second pumping laser 4-2 and the third pumping laser 4-3. The first pumping laser 4-1 injects forward pumping light into the first erbium-doped optical fiber 1-1 in the independent pumping mode, and the second pumping laser 4-2 injects backward pumping light into the second erbium-doped optical fiber 1-2 and the first erbium-doped optical fiber 1-1 in the splitting pumping mode, and the third pumping laser 4-3 injects forward pumping light into the third erbium-doped optical fiber 1-4 and the second erbium-doped optical fiber 1-2 in the splitting pumping mode. The specific implementation may be as follows:

The VGA further comprises a second pumping beam splitter 5-2 and a third pumping beam splitter 5-3. The first pumping laser 4-1 is connected with the pumping end of the first combiner 3-1, the second pumping laser 4-2 is connected with a common end of the second pumping beam splitter 5-2, a first splitting port of the second pumping beam splitter 5-2 is connected with the pumping end of the fourth combiner 3-4, and a second splitting port of the second pumping beam splitter 5-2 is connected with the pumping end of the second combiner 3-2. The third pumping laser 4-3 is connected with a common end of the third pumping beam splitter 5-3, a first splitting port of the third pumping beam splitter 5-3 is connected with the pumping end of the fifth combiner 3-5, and a second splitting port of the third pumping beam splitter 5-3 is connected with the pumping end of the third combiner 3-3.

The two VGA structures shown in FIG. 4 and FIG. 5 have the same main optical signal path, and the only difference is the way of injecting forward pumping light into each erbium-doped optical fiber. Compared with the case in which each erbium-doped optical fiber adopts the independent pumping, the present embodiment can save the cost, and the overall performance of the amplifier is better. Referring to Embodiment 1, in comprehensive consideration of the cost and the performance, the backward pumping light generated by the second pumping laser 4-2 has a wavelength in a range of 1460 nm to 1490 nm, and the forward pumping light generated by the first pumping laser 4-1 has a wavelength in a range of 973 nm to 982 nm.

In the embodiment, preferably, for any one of the pumping beam splitter, a splitting ratio of the first splitting port is larger than that of the corresponding second splitting port, and the splitting ratio of the first splitting port is in a range of 70% to 90%, the splitting ratio of the corresponding second splitting port is in a range of 30% to 10%. For example, in the present embodiment, the splitting ratio of the first splitting port is 80%, and the splitting ratio of the second splitting port is 20%. By setting of the splitting ratio, the overall performance of the amplifier may be better optimized.

Embodiment 3

Figure 6:
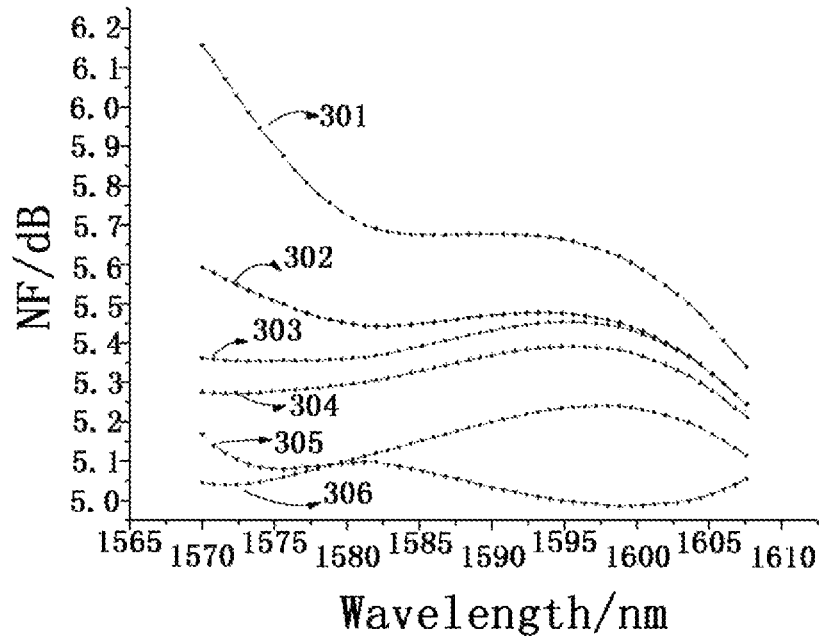
FIG. 6 is a graph showing noise figures corresponding to different pumping modes under the same gain and output power conditions.

In the present embodiment, the respective pumping modes are compared by experiments to demonstrate the overall performance of the optical fiber amplifiers provided by the present application. Specifically, taking the FGA provided in the Embodiment 1 as an example, the optical path comprises two erbium-doped optical fibers that need to be injected with pumping light. Under the same gain and output power, a relationship between the noise figure and the pumping modes and a relationship between the non-linear four-wave mixing effect and the pumping modes are studied. The study shows that the overall performance of the optical fiber amplifier is optimal when the two erbium-doped optical fibers both adopt bidirectional pumping and the absorbing erbium-doped fiber is additionally provided. The detailed experiment results are as follows:

FIG. 6 is a graph showing noise figure curves corresponding to different pumping modes with the same FGA gain and output power. With reference to the FGA structure diagram of FIG. 3, the curves in FIG. 6 correspond to the following pumping modes:

301: the first erbium-doped optical fiber 1-1 is forward-pumped, and the second erbium-doped optical fiber 1-2 is backward-pumped;

302: the first erbium-doped optical fiber 1-1 is bidirectionally pumped (100% pump1 forward+20% pump2 backward), and the second erbium-doped optical fiber 1-2 is backward-pumped (80% pump2 backward);

303: the first erbium-doped optical fiber 1-1 is forward-pumped (80% pump1 forward), and the second erbium-doped optical fiber 1-2 is bidirectionally pumped (20% pump1 forward+100% pump2 backward);

304: the first erbium-doped optical fiber 1-1 is bidirectionally pumped (80% pump1 forward and 20% pump2 backward), and the second erbium-doped optical fiber 1-2 is bidirectionally pumped (20% pump1 forward+100% pump2 backward);

305: the first erbium-doped optical fiber 1-1 is bidirectionally pumped (80% pump1 forward and 20% pump2 backward), and the second erbium-doped optical fiber 1-2 is bidirectionally pumped (20% pump1 forward+100% pump2 backward), the absorbing erbium-doped fiber 1-3 of 1 m has no pumping light injection;

306: the first erbium-doped optical fiber 1-1 is forward pumped, and the second erbium-doped optical fiber 1-2 is forward pumped.

The pump1 represents the first pumping laser 4-1, the pump2 represents the second pumping laser 4-2, and 80% and 20% represent the splitting ratio of the two splitting ports of the corresponding pumping beam splitter. The pumping mode corresponding to the curve 305 is the pumping mode used in the optical fiber amplifier of the present application. As can be seen from the figure, among all pumping modes, the curve 305 and the curve 306 has the lowest noise figure, especially when the wavelength is larger than 1578 nm, the noise figure of the curve 305 reaches the minimal value. With the same gain and output power, the erbium-doped fibers used in the double forward pumping of the curve 306 have a length of about 1.2 times of that in the pumping mode of the curve 305, and the pumping power of the pumping mode of the curve 306 is about 1.1 times of that of the curve 305. As seen, the cost of the double forward pumping mode corresponding to the curve 306 is obviously higher than that of the pumping mode of the curve 305. Meanwhile, in the double forward pumping, the maximum power of a single channel in the erbium-doped optical fiber is about 3 times of that in the pumping mode of the curve 305, causing much more series nonlinear effects such as the four-wave mixing effect, as shown in FIG. 7.

Figure 7:
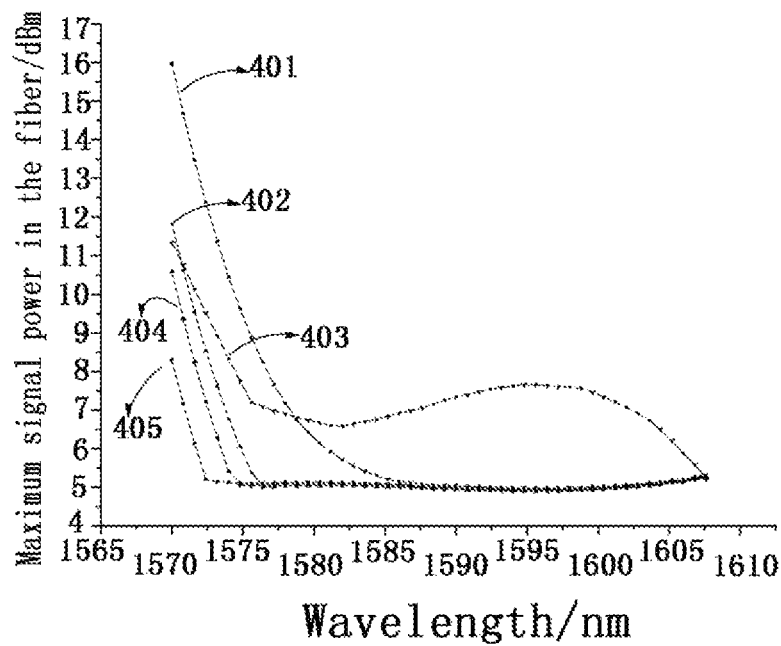
FIG. 7 is a graph showing maximum signal power corresponding to different pumping modes under the same gain and output power conditions.

FIG. 7 is a graph showing a maximum power of a single channel in the erbium-doped optical fiber corresponding to different pumping modes. The larger the power is, the stronger the nonlinear effect in the amplifier is, and the overall performance of the amplifier is affected. The curves in FIG. 7 correspond to the following pumping modes:

401: the first erbium-doped optical fiber 1-1 is forward pumped, and the second erbium-doped optical fiber 1-2 is forward pumped;

402: the first erbium-doped optical fiber 1-1 is bidirectionally pumped (80% pump1 forward+20% pump2 backward), and the second erbium-doped optical fiber 1-2 is bidirectionally pumped (20% pump1 forward+100% pump2 backward);

403: the first erbium-doped optical fiber 1-1 is bidirectionally pumped (80% pump1 forward+20% pump2 backward), the second erbium-doped optical fiber 1-2 is bidirectionally pumped (20% pump1 forward+100% pump2 backward), and the absorbing erbium-doped fiber 1-3 of 1 m has no pumping light injection;

404: the first erbium-doped optical fiber 1-1 is bidirectionally pumped (100% pump1 forward+20% pump2 backward), and the second erbium-doped optical fiber 1-2 is backward-pumped (80% pump2 backward);

405: the first erbium-doped optical fiber 1-1 is forward-pumped, and the second erbium-doped optical fiber 1-2 is backward pumped.

The pumping mode corresponding to the curve 403 is the pumping mode used in the optical fiber amplifier of the present application. As shown in FIG. 7, the maximum power of the single channel in the erbium-doped optical fiber corresponding to the double forward pumping mode of the curve 401 is much higher than that corresponding to the other pumping modes of the other curves, causing a serious nonlinear effect such as the four-wave mixing effect, while the nonlinear effect is well controlled for the curve 403.

Therefore, in comprehensive consideration of factors such as the conversion efficiency, the noise figure and the nonlinear effect, the pumping mode in which the first erbium-doped optical fiber 1-1 is bidirectionally pumped (80% pump1 forward+20% pump2 backward), the second erbium-doped optical fiber 1-2 is bidirectionally pumped (20% pump1 forward+100% pump2 backward), and the absorbing erbium-doped optical fiber 1-3 of 1 m has no pumping light injection, can achieve an optimal noise figure, a relative low nonlinear effect, and a relative high pumping conversion efficiency, and the cost of the L-band optical fiber amplifier can be greatly reduced, thereby resulting in a high performance cost ratio.

The above described are only preferred embodiments of the present invention, and are not intended to limit the present invention. Any modification, replacement and improvement made within the spirit and principle of the invention shall be included in the protection scope of the invention.

The invention claimed is:

1. A balanced pumping L-band optical fiber amplifier, characterized in comprising a first erbium-doped optical fiber (1-1), a second erbium-doped optical fiber (1-2), an absorbing erbium-doped optical fiber (1-3) and at least two pumping lasers, the first erbium-doped optical fiber (1-1), the second erbium-doped optical fiber (1-2) and the absorbing erbium-doped optical fiber (1-3) being sequentially arranged in this order, and the at least two pumping lasers providing pumping light;

wherein the first erbium-doped optical fiber (1-1) is injected with forward pumping light and backward pumping light by the at least two pumping lasers, the second erbium-doped optical fiber (1-2) is injected with forward pumping light and backward pumping light by the at least two pumping lasers, and the absorbing erbium-doped fiber (1-3) is arranged downstream of the second erbium-doped optical fiber (1-2) to absorb amplified spontaneous emission (ASE) generated in the amplifier;

a first isolator (2-1), a first combiner (3-1), a second combiner (3-2), a third combiner (3-3), a fourth combiner (3-4), a second isolator (2-2) and a third isolator (2-3) connected sequentially in this order;

wherein the first erbium-doped optical fiber (1-1) is connected between a common end of the first combiner (3-1) and a common end of the second combiner (3-2), the second erbium-doped optical fiber (1-2) is connected between a common end of the third combiner (3-3) and a common end of the fourth combiner (3-4), and the absorbing erbium-doped optical fiber (1-3) is connected between the second isolator (2-2) and the third isolator (2-3);

wherein the at least two pumping lasers comprise a first pumping laser (4-1) and a second pumping laser (4-2), and the optical fiber amplifier further comprises a first pumping beam splitter (5-1) and a second pumping beam splitter (5-2);

wherein the first pumping laser (4-1) is connected with a common end of the first pumping beam splitter (5-1), a first splitting port of the first pumping beam splitter (5-1) is connected with a pumping end of the first combiner (3-1), and a second splitting port of the first pumping beam splitter (5-1) is connected with a pumping end of the third combiner (3-3), so that the first pumping laser (4-1) injects the forward pumping light into the first erbium-doped optical fiber (1-1) and the second erbium-doped optical fiber (1-2) in the splitting pumping mode; and the second pumping laser (4-2) is connected with a common end of the second pumping beam splitter (5-2), a first splitting port of the second pumping beam splitter (5-2) is connected with a pumping end of the fourth combiner (3-4), and a second splitting port of the second pumping beam splitter (5-2) is connected with a pumping end of the second combiner (3-2), so that the second pumping laser (4-2) injects the backward pumping light into the second erbium-doped optical fiber (1-2) and the first erbium-doped optical fiber (1-1) in the splitting pumping mode.

2. The balanced pumping L-band optical fiber amplifier of claim 1, characterized in that each pumping laser adopts an independent pumping mode or a splitting pumping mode to provide the pumping light for the erbium-doped optical fibers that need to be injected with the pumping light.

3. The balanced pumping L-band optical fiber amplifier of claim 1, characterized in further comprising a gain flatten filter (6) connected between a signal end of the second combiner (3-2) and a signal end of the third combiner (3-3), the gain flatten filter (6) itself including an integrated isolator.

4. The balanced pumping L-band optical fiber amplifier of claim 3, characterized in that between the second combiner (3-2) and the gain flatten filter (6) are further provided a fourth isolator (2-4), a variable optical attenuator (7), a fifth combiner (3-5) and a third erbium-doped optical fiber (1-4) sequentially connected in this order, and the third erbium-doped optical fiber (1-4) is connected with a common end of the fifth combiner (3-5).

5. The balanced pumping L-band optical fiber amplifier of claim 4, characterized in that the at least two pumping lasers comprise a first pumping laser (4-1), a second pumping laser (4-2) and a third pumping laser (4-3), and the optical fiber amplifier further comprises a first pumping beam splitter (5-1) and a second pumping beam splitter (5-2);

wherein the first pumping laser (4-1) is connected with a common end of the first pumping beam splitter (5-1), a first splitting port of the first pumping beam splitter (5-1) is connected with a pumping end of the first combiner (3-1), and a second splitting port of the first pumping beam splitter (5-1) is connected with a pumping end of the third combiner (3-3), so that the first pumping laser (4-1) injects the forward pumping light into the first erbium-doped optical fiber (1-1) and the second erbium-doped optical fiber (1-2) in the splitting pumping mode;

the second pumping laser (4-2) is connected with a common end of the second pumping beam splitter (5-2), a first splitting port of the second pumping beam splitter (5-2) is connected with a pumping end of the fourth combiner (3-4), and a second splitting port of the second pumping beam splitter (5-2) is connected with a pumping end of the second combiner (3-2), so that the second pumping laser (4-2) injects the backward pumping light into the second erbium-doped optical fiber (1-2) and the first erbium-doped optical fiber (1-1) in the splitting pumping mode;

the third pumping laser (4-3) is connected with a pumping end of the fifth combiner (3-5), so that the third pumping laser (4-3) injects the forward pumping light into the third erbium- doped optical fiber (1-4) in the independent pumping mode.

6. The balanced pumping L-band optical fiber amplifier of claim 4, characterized in that the at least two pumping lasers comprise a first pumping laser (4-1), a second pumping laser (4-2) and a third pumping laser (4-3), and the optical fiber amplifier further comprises a second pumping beam splitter (5-2) and a third pumping beam splitter (5-3);

wherein the first pumping laser (4-1) is connected with a pumping end of the first combiner (3-1), so that the first pumping laser (4-1) injects the forward pumping light into the first erbium-doped optical fiber (1-1) in the independent pumping mode;

the second pumping laser (4-2) is connected with a common end of the second pumping beam splitter (5-2), a first splitting port of the second pumping beam splitter (5-2) is connected with a pumping end of the fourth combiner (3-4), and a second splitting port of the second pumping beam splitter (5-2) is connected with a pumping end of the second combiner (3-2), so that the second pumping laser (4-2) injects the backward pumping light into the second erbium-doped optical fiber (1-2) and the first erbium-doped optical fiber (1-1) in the splitting pumping mode;

the third pumping laser (4-3) is connected with a common end of the third pumping beam splitter (5-3), the first splitting port of the third pumping beam splitter (5-3) is connected with a pumping end of the fifth combiner (3-5), and a second splitting port of the third pumping beam splitter (5-3) is connected with a pumping end of the third combiner (3-3), so that the third pumping laser (4-3) injects the forward pumping light into the third erbium-doped optical fiber (1-4) and the second erbium-doped optical fiber (1-2) in the splitting pumping mode.

7. The balanced pumping L-band optical fiber amplifier of claim 1, characterized in that in each of the pumping beam splitters, a splitting ratio of the first splitting port is in a range from 70% to 90%, and a splitting ratio of the second splitting port is in a range of 30% to 10%.

8. The balanced pumping L-band optical fiber amplifier of claim 5, characterized in that in each of the pumping beam splitters, a splitting ratio of the first splitting port is in a range from 70% to 90%, and a splitting ratio of the second splitting port is in a range of 30% to 10%.

9. The balanced pumping L-band optical fiber amplifier of claim 6, characterized in that in each of the pumping beam splitters, a splitting ratio of the first splitting port is in a range from 70% to 90%, and a splitting ratio of the second splitting port is in a range of 30% to 10%.

10. The balanced pumping L-band optical fiber amplifier of claim 1, characterized in that the at least two pumping lasers generate pumping light with wavelength that satisfies the following conditions: the wavelength of the backward pumping light ranges from 1460 nm to 1490 nm, and the wavelength of the forward pumping light ranges from 973 nm to 982 nm.

11. A balanced pumping L-band optical fiber amplifier, comprising:
   a first erbium-doped optical fiber;
   a second erbium-doped optical fiber;
   an absorbing erbium-doped optical fiber and at least two pumping lasers, the first erbium-doped optical fiber, the second erbium-doped optical fiber and the absorbing erbium-doped optical fiber being arranged sequentially, the at least two pumping lasers providing pumping light;
   a first isolator, a first combiner, a second combiner, a third combiner, a fourth combiner, a second isolator and a third isolator connected sequentially; and
   a gain flatten filter connected between a signal end of the second combiner and a signal end of the third combiner, the gain flatten filter including an integrated isolator;
   wherein the first erbium-doped optical fiber is injected with a forward pumping light and a backward pumping light by the at least two pumping lasers, the second erbium-doped optical fiber being injected with a forward pumping light and a backward pumping light by the at least two pumping lasers, the absorbing erbium-doped fiber being arranged downstream of the second erbium-doped optical fiber to absorb amplified spontaneous emission (ASE) generated in the amplifier;
   wherein the first erbium-doped optical fiber is connected between a common end of the first combiner and a common end of the second combiner, the second erbium-doped optical fiber is connected between a common end of the third combiner and a common end of the fourth combiner, and the absorbing erbium-doped optical fiber is connected between the second isolator and the third isolator; and
   wherein between the second combiner and the gain flatten filter are further provided a fourth isolator, a variable optical attenuator, a fifth combiner and a third erbium-doped optical fiber connected sequentially, the third erbium-doped optical fiber connected with a common end of the fifth combiner.

12. The balanced pumping L-band optical fiber amplifier of claim 11, characterized in that the at least two pumping lasers comprise a first pumping laser, a second pumping laser and a third pumping laser, and the optical fiber amplifier further comprises a first pumping beam splitter and a second pumping beam splitter;
   wherein the first pumping laser is connected with a common end of the first pumping beam splitter, a first splitting port of the first pumping beam splitter is connected with a pumping end of the first combiner, and a second splitting port of the first pumping beam splitter is connected with a pumping end of the third combiner, so that the first pumping laser injects the forward pumping light into the first erbium-doped optical fiber and the second erbium-doped optical fiber in the splitting pumping mode;
   the second pumping laser is connected with a common end of the second pumping beam splitter, a first splitting port of the second pumping beam splitter is connected with a pumping end of the fourth combiner, and a second splitting port of the second pumping beam splitter is connected with a pumping end of the second combiner, so that the second pumping laser injects the backward pumping light into the second erbium-doped optical fiber and the first erbium-doped optical fiber in the splitting pumping mode;
   the third pumping laser is connected with a pumping end of the fifth combiner, so that the third pumping laser injects the forward pumping light into the third erbium-doped optical fiber in the independent pumping mode.

13. The balanced pumping L-band optical fiber amplifier of claim 11, characterized in that the at least two pumping lasers comprise a first pumping laser, a second pumping laser and a third pumping laser, and the optical fiber amplifier further comprises a second pumping beam splitter and a third pumping beam splitter;
   wherein the first pumping laser is connected with a pumping end of the first combiner, so that the first pumping laser injects the forward pumping light into the first erbium-doped optical fiber in the independent pumping mode;
   the second pumping laser is connected with a common end of the second pumping beam splitter, a first splitting port of the second pumping beam splitter is connected with a pumping end of the fourth combiner, and a second splitting port of the second pumping beam splitter is connected with a pumping end of the second combiner, so that the second pumping laser injects the backward pumping light into the second erbium-doped optical fiber and the first erbium-doped optical fiber in the splitting pumping mode;
   the third pumping laser is connected with a common end of the third pumping beam splitter, the first splitting port of the third pumping beam splitter is connected with a pumping end of the fifth combiner, and a second splitting port of the third pumping beam splitter is connected with a pumping end of the third combiner, so that the third pumping laser injects the forward pumping light into the third erbium-doped optical fiber and the second erbium-doped optical fiber in the splitting pumping mode.

14. The balanced pumping L-band optical fiber amplifier of claim 12, characterized in that in each of the pumping beam splitters, a splitting ratio of the first splitting port is in a range from 70% to 90%, and a splitting ratio of the second splitting port is in a range of 30% to 10%.

15. The balanced pumping L-band optical fiber amplifier of claim 14, characterized in that in each of the pumping beam splitters, a splitting ratio of the first splitting port is in a range from 70% to 90%, and a splitting ratio of the second splitting port is in a range of 30% to 10%.

16. The balanced pumping L-band optical fiber amplifier of claim 11, characterized in that the at least two pumping lasers generate pumping light with wavelength that satisfies the following conditions: the wavelength of the backward pumping light ranges from 1460 nm to 1490 nm, and the wavelength of the forward pumping light ranges from 973 nm to 982 nm.

* * * * *